US010422348B2

(12) United States Patent
Kray et al.

(10) Patent No.: US 10,422,348 B2
(45) Date of Patent: Sep. 24, 2019

(54) UNSYMMETRICAL TURBOFAN ABRADABLE GRIND FOR REDUCED RUB LOADS

(71) Applicant: General Electric Company, Schenectady, NY (US)

(72) Inventors: Nicholas Joseph Kray, Mason, OH (US); Daniel Edward Mollmann, Cincinnati, OH (US); Andrew Breeze-Stringfellow, Montgomery, OH (US)

(73) Assignee: General Electric Company, Schenectady, NY (US)

( * ) Notice: Subject to any disclaimer, the term of this patent is extended or adjusted under 35 U.S.C. 154(b) by 219 days.

(21) Appl. No.: 15/402,536

(22) Filed: Jan. 10, 2017

(65) Prior Publication Data

US 2018/0195527 A1 Jul. 12, 2018

(51) Int. Cl.

| | |
|---|---|
| ***F04D 29/52*** | (2006.01) |
| ***F01D 21/04*** | (2006.01) |
| ***F02C 7/04*** | (2006.01) |
| ***F04D 29/38*** | (2006.01) |
| ***F02K 3/06*** | (2006.01) |

(52) U.S. Cl.

CPC ......... *F04D 29/526* (2013.01); *F01D 21/045* (2013.01); *F02C 7/04* (2013.01); *F02K 3/06* (2013.01); *F04D 29/38* (2013.01); *F05D 2220/36* (2013.01); *F05D 2240/307* (2013.01); *F05D 2250/73* (2013.01); *F05D 2300/506* (2013.01); *F05D 2300/603* (2013.01); *Y02T 50/672* (2013.01)

(58) Field of Classification Search

CPC ...... F04D 29/329; F04D 29/38; F04D 29/545; F04D 29/526; F02K 3/04; F02C 7/04; F01D 21/045

See application file for complete search history.

(56) References Cited

U.S. PATENT DOCUMENTS

| | | | | |
|---|---|---|---|---|
| 3,319,929 A * | 5/1967 | Lawrence | F01D 5/10 | 188/381 |
| 3,572,963 A * | 3/1971 | Marino | F04D 29/162 | 415/172.1 |
| 4,809,498 A | 3/1989 | Griffin, III et al. | | |
| 6,830,428 B2 | 12/2004 | Le Biez et al. | | |
| 8,016,543 B2 * | 9/2011 | Braley | F01D 21/045 | 415/173.4 |

(Continued)

FOREIGN PATENT DOCUMENTS

| | | |
|---|---|---|
| EP | 1004750 | 5/2000 |

*Primary Examiner* — David E Sosnowski
*Assistant Examiner* — Maranatha Boardman
(74) *Attorney, Agent, or Firm* — General Electric; James Reed

(57) ABSTRACT

A containment structure comprising an annular structure configured to provide close tolerance to a rotation structure. The containment structure includes a first abradable structure, a second abradable structure, and a shroud that is defined in part by the first abradable structure and in part by the second abradable structure. An annular surface of the shroud is defined by the first abradable structure and by the second abradable structure. The first abradable structure is harder than the second abradable structure.

14 Claims, 4 Drawing Sheets

(56) References Cited

U.S. PATENT DOCUMENTS

| | | | | |
|---|---|---|---|---|
| 8,162,602 | B2 * | 4/2012 | Caucheteux | F01D 11/122<br>415/115 |
| 8,684,671 | B2 * | 4/2014 | Froissart | F01D 11/08<br>415/119 |
| 8,757,958 | B2 | 6/2014 | Lussier | |
| 9,200,531 | B2 | 12/2015 | Robertson, Jr. et al. | |
| 2001/0048876 | A1 * | 12/2001 | Humhauser | F01D 11/122<br>415/139 |
| 2008/0199306 | A1 * | 8/2008 | Lebret | F01D 5/143<br>D5/143 |
| 2008/0206542 | A1 * | 8/2008 | Vance | F01D 11/122<br>428/304.4 |
| 2011/0211943 | A1 * | 9/2011 | Belbeck | F01D 11/12<br>415/182.1 |
| 2014/0093360 | A1 | 4/2014 | Strock | |
| 2014/0147262 | A1 | 5/2014 | Grelin | |
| 2015/0354396 | A1 | 12/2015 | Leszczynski et al. | |
| 2016/0236994 | A1 * | 8/2016 | Vetters | C04B 41/87 |

* cited by examiner

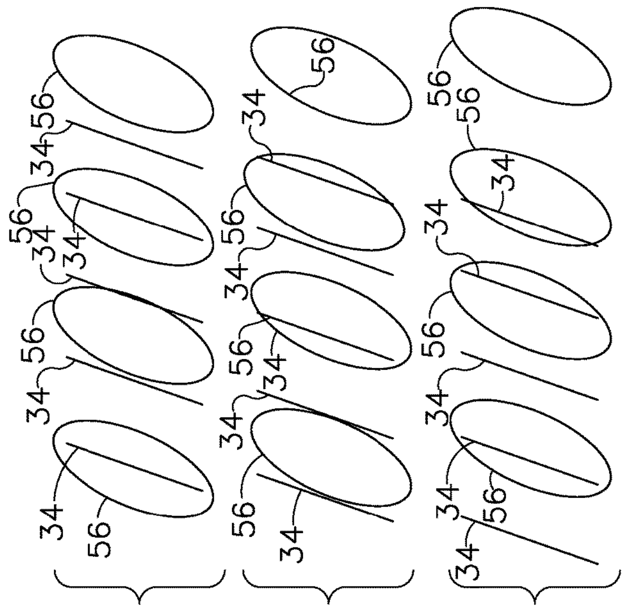
FIG. 4A
FIG. 4B
FIG. 4C
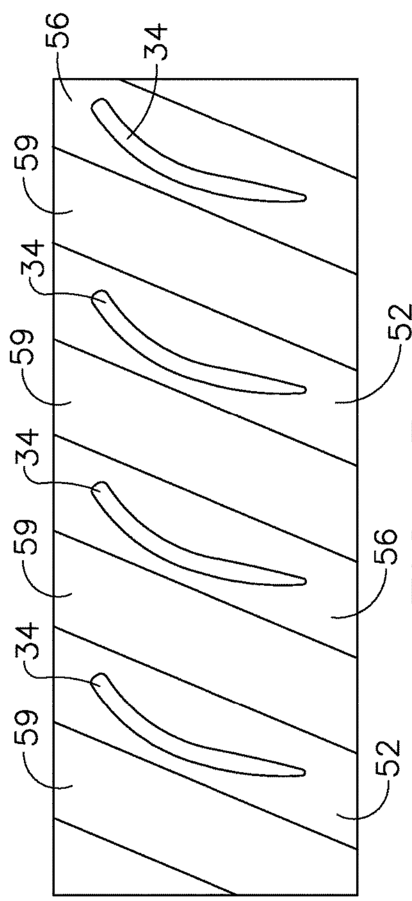
FIG. 5

UNSYMMETRICAL TURBOFAN ABRADABLE GRIND FOR REDUCED RUB LOADS

BACKGROUND OF THE INVENTION

The present invention relates to abradable shroud assemblies for use in turbomachinery, such as gas turbine engines. More particularly, this invention relates to a shroud assembly that includes abradable material configured in a non-axi-symmetric grind to reduce overall rotor system loading when the blades and abradable system come in contact.

In most turbofan engines the fan is contained by a fan case that is equipped with a shroud. The shroud circumscribes the fan and is adjacent to the tips of the fan blades. The shroud serves to channel incoming air through the fan so as to ensure that most of the air entering the engine will be compressed by the fan. A small portion of the air is able to bypass the fan blades through a radial gap present between the tips of the fan blades and the shroud. The radial gap is very narrow such that the amount of air that is able to bypass the fan through the gap is limited. The efficiency of the engine can be significantly improved in this way.

Because the gap is narrow, the fan blades may rub the shroud during the normal operation of an aircraft turbofan engine. An abradable material is configured into the shroud for this purpose. However, any rubbing contact between the tips of the fan blades and the shroud will tend to cause the fan blades to deflect and eventually become unstable as the rotor loading increases. Such rubbing events can be self-feeding as the blades continue to deflect with increasing rotor load. Therefore there is a need for a shroud that is configured to minimize the overall rotor loading during blade/case rubbing events.

BRIEF DESCRIPTION OF THE INVENTION

This need is addressed by a shroud that includes a non-axi-symmetric abradable profile interface having a surface in which regions of a high-modulus abradable material are distributed within areas of a low-modulus material.

According to one aspect of the present invention, there is provided a containment structure comprising an annular structure configured to provide close tolerance to a rotation structure. The containment structure includes a first abradable structure, a second abradable structure, and a shroud that is defined in part by the first abradable structure and in part by the second abradable structure. An annular surface of the shroud is defined by the first abradable structure and by the second abradable structure. The first abradable structure is harder than the second abradable structure.

BRIEF DESCRIPTION OF THE DRAWINGS

The invention may be best understood by reference to the following description taken in conjunction with the accompanying drawing figures in which:

FIG. 4A is a schematic representation of a fan showing relative position of blade tips with abradable shroud material at a first time;

FIG. 4B is a schematic representation of the fan shown in FIG. 4A at a second time;

FIG. 4C is a schematic representation of the fan shown in FIG. 4A at a third time; and FIG. 5 is a schematic representation of a shroud and blade tip relative position.

DETAILED DESCRIPTION OF THE INVENTION

Figure 1:
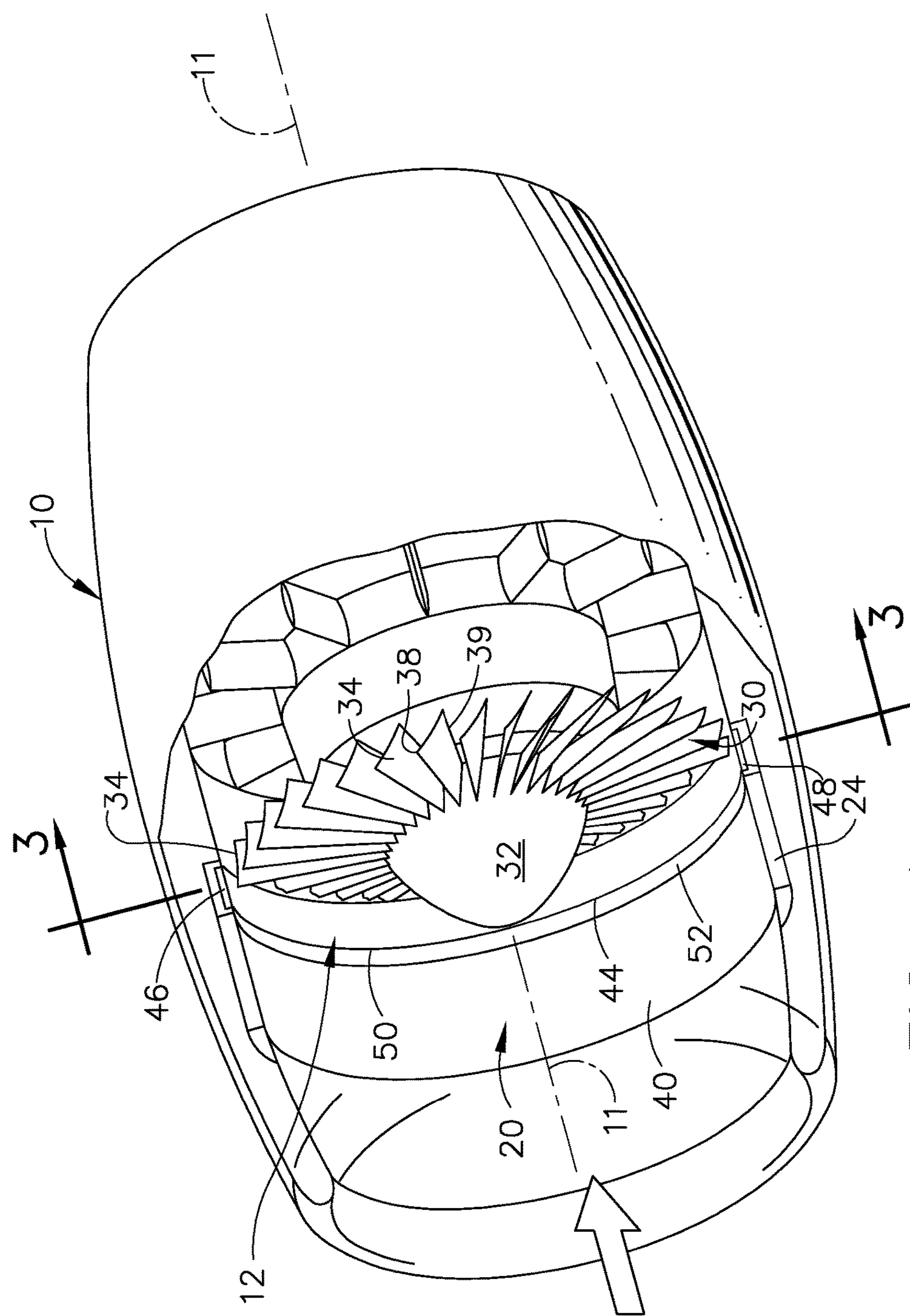
FIG. 1 is an enlarged partial view of the fan section of a turbofan engine.
Figure 2:
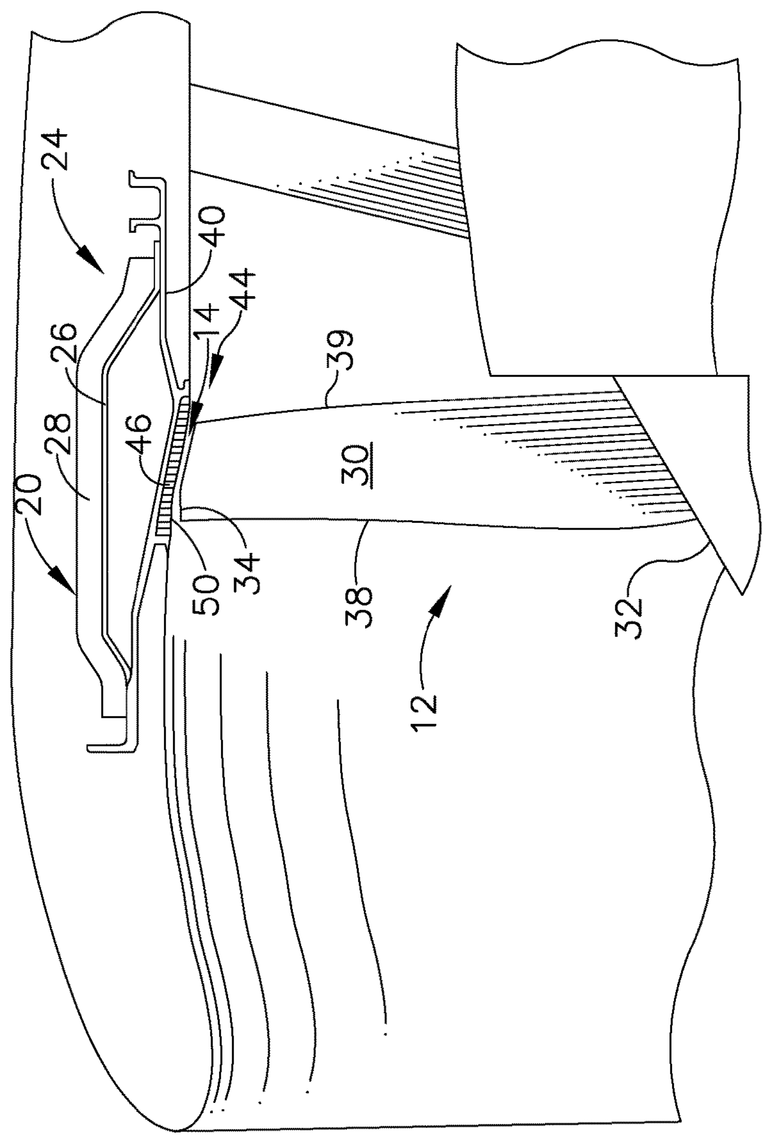
FIG. 2 is a cut-away sectional view of a turbofan engine showing the contoured surface of the fan shroud.

Referring to the drawings wherein identical reference numerals denote the same elements throughout the various views, FIGS. 1 and 2 illustrate an abradable containment structure 20 for use in turbomachinery, such as a high bypass turbofan engine 10. The containment structure 20 can be used in other machinery that includes a rotation structure such as pumps, compressors, or turbomachinery. In the configuration shown, the engine 10 includes a rotation structure that is a fan 12 and a plurality of fan blades 30. The fan blades 30 are mounted to the fan disk 32.

Figure 3:
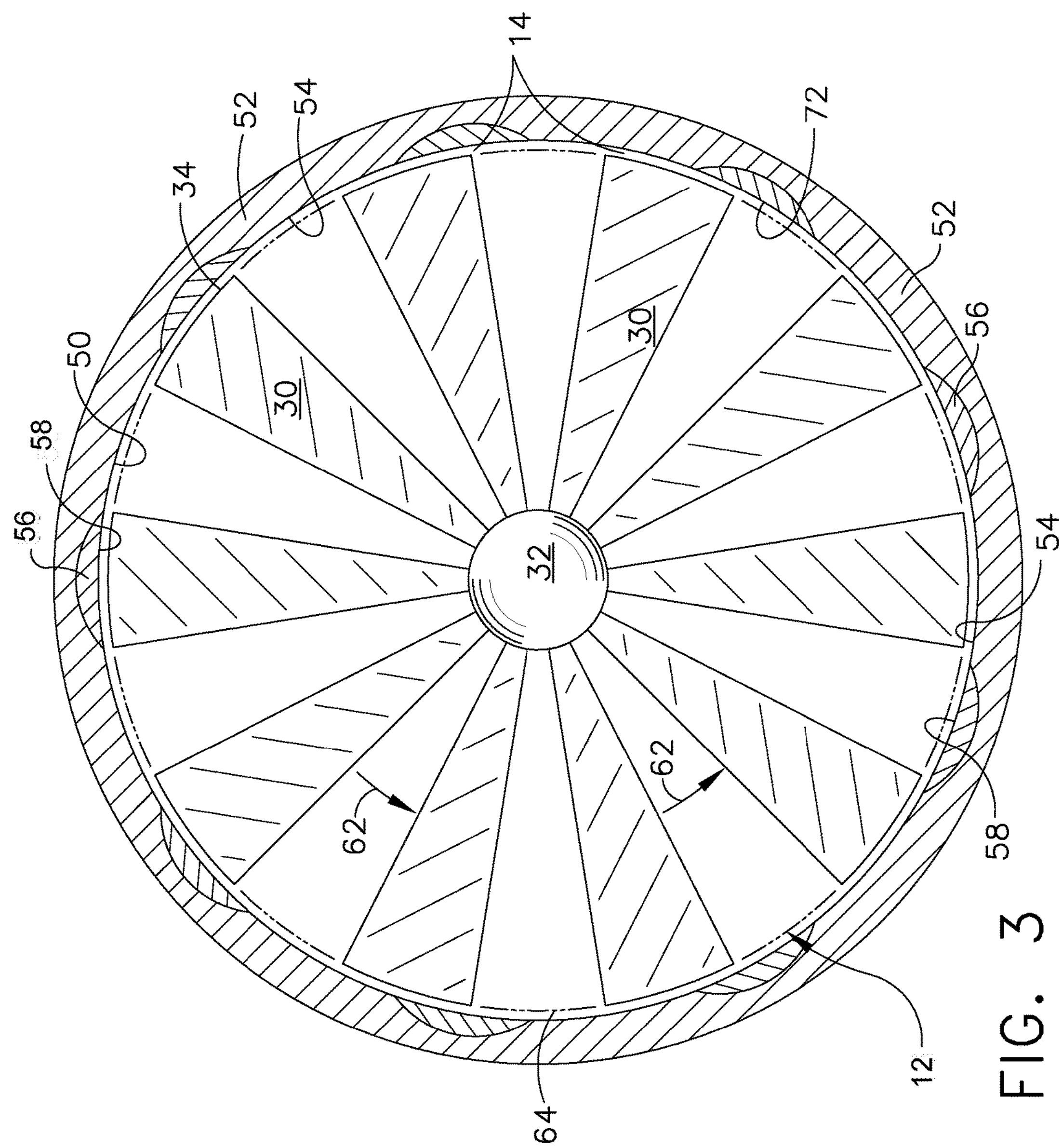
FIG. 3 is a sectional view aft of the fan and fan shroud of FIG. 1 taken along the line 3-3.

The fan blades 30 include blade tips 34 that are configured to define a blade path 62 during normal operation (as shown in FIG. 3). The blades 30 are configured such that the blade tips 34 are positioned a first predetermined distance from a centerline axis 11 of the engine 10 at a leading edge 38 and tapered to a second predetermined distance from the centerline axis 11 of the engine 10 at a trailing edge 39 of the blade 30. The first predetermined distance can be greater than the second predetermined distance.

The containment structure 20 circumscribes the fan blades 30 and includes a forward fan case 24. The forward fan case 24 has an inner fan casing 40 that is usually made of aluminum, surrounded by an aluminum honeycomb surrounded by a graphite epoxy outer fan casing 26 surrounded by an aramid fiber cover such as KEVLAR cover 28. The inner fan casing 40 includes a fan shroud 44 that defines an inner annular surface 50. The inner annular surface 50 has a generally circular cross-section and defines an inner diameter of the inner casing 40. The fan shroud 44 is configured to channel the incoming air through the fan 12 so as to ensure that the fan 12 will compress the bulk of the air entering the engine 10. By way of example and not limitation, the forward fan case 24 and the inner fan casing 40 can be made of the following: a metal, aluminum, a composite material, and a combination thereof.

Preferably, a small radial gap 14 is present between the tips 34 of the fan blades 30 and the inner annular surface 50. It is this clearance, i.e., the radial gap 14, that is minimized in order to promote the efficiency of the engine 10.

Referring now to FIG. 3, the shroud 44 includes two types of inner structures that define the inner surface 50. A first abradable structure 52 and a plurality of second abradable structures 56. The first abradable structure 52 is formed of a high-modulus, relatively hard, material and the plurality of second abradable structures 56 is formed of a low modulus, relatively soft, material. According to the illustrated embodiment, the second abradable structures 56 are positioned in trenches or pockets that have been ground into the first abradable structure 52. By way of example and not limitation, the first abradable structure 52 can include one of the following materials: Epoxy and phenolic microspheres, and Nomex core, Silicone with hollow glass microspheres, Silicone polymer, Porous Teflon—PTFE plastic, and a combination thereof. By way of example and not limitation, the plurality of second abradable structures 56 can include one of the following materials: Epoxy with thermoplastic microspheres and PEEK fiber, Two-part flame retardant epoxy with glass microspheres, Epoxy with thermoplastic microspheres and nylon/Polyether ether ketone (PEEK) fiber, and a combination thereof.

As indicated above, the inner surface 50 includes a plurality of harder first regions or surfaces 54 and a plurality of softer second regions or surfaces 58 defined by the first abradable structure 52 and the plurality of second abradable structures 56, respectively.

The inner surface 50 is spaced-apart from associated blade tips 34 of blades 30 by the radial gap 14 and the blades 30 are configured to rotate about the axis 11 through the annular blade path 62. The annular blade path 62 defines an outer edge 64 that under normal, non-rubbing, conditions defines one side of the radial gap 14. Across the radial gap 14 from the blade path 62, a rub path 72 is defined on the inner surface 50 on the shroud 44. Along the rub path 72, hard surfaces 54 and soft surfaces 58 alternate.

In the illustrated embodiment, the hard surfaces 54 are configured as rhomboids that slope forward to aft relative to the axis 11 at an angle about equal to the stagger angle of the blades 30. The hard surfaces 54 are spaced-apart along the rub path 72 such that less than the total number of the blade tips 34 can be opposite a hard surface 54 at any given time. It should be appreciated that the hard surfaces 54 can be configured as other geometric shapes and positioned in other matters relative to the axis 11. In some embodiments, the hard services 54 can be defined as islands that are each surrounded by the soft surface 58. According to the illustrated embodiment, the number of hard surfaces 54 is one less than the number of blades 30.

The present invention can be better understood through a description of the operation thereof. The blade tips 34 are positioned radially around the axis 11 across from the rub path 72 such that a predetermined percentage R of the blade tips 34 is across from hard surfaces 54. The percentage R is less than 100%.

The portion of blade tips 34 that are not opposite hard surfaces 54 are evenly distributed around the axis 11. The blade tips 34 and the hard surfaces 54 are positioned such that the percentage R is generally constant as the blades 30 rotate through the blade path 62. FIGS. 4A, 4B, and 4C show that at any given time the fraction of the total number of blade tips 34 over a hard surface 54 is substantially the same even though a given blade tip 34 might be over a hard surface 54 at a first time and a soft surface 58 at a second time.

When a rubbing event occurs, at least some of the blades 30 contact the inner surface 50. Some of the blades 30 contact the hard surface 54 but some of the blades 30 either do not contact the region of hard surface 54 or contact a reduced amount of the hard surface 54. In some embodiments an individual blade tip 34 can contact both a portion of a hard surface 54 and a portion of a soft surface 58. Relative to a conventional engine, in which all of the blade tips involved in a rubbing event are contacting a hard surface, the rub load generated during a rub event involving the blades 30 and the inner surface 50 described above is less than that of a conventional turbofan engine.

The advantage of the containment case including an asymmetrical ground abradable material of the present invention over the prior art is that the interaction of the blades with the case during rub events generates less of a load than in conventional engines. By dispersing regions of high modulus material asymmetrically, the number of blades that come in contact with high modulus material is reduced relative to a similar rub event in conventional engines. As a result, the vision of the present invention can tolerate a more severe rub event than conventional engines. Thus a tighter running clearance can be achieved with reduced to system risk for unstable rub events.

The foregoing has described an apparatus, i.e., a containment case for use in turbomachinery that includes an abradable shroud having two abradable structures. One of the low modulus. In one a high modulus that is ground in non-axially symmetric pattern. All of the features disclosed in this specification (including any accompanying claims, abstract and drawings), and/or all of the steps of any method or process so disclosed, may be combined in any combination, except combinations where at least some of such features and/or steps are mutually exclusive.

Each feature disclosed in this specification (including any accompanying claims, abstract and drawings) may be replaced by alternative features serving the same, equivalent or similar purpose, unless expressly stated otherwise. Thus, unless expressly stated otherwise, each feature disclosed is one example only of a generic series of equivalent or similar features.

The invention is not restricted to the details of the foregoing embodiment(s). The invention extends to any novel one, or any novel combination, of the features disclosed in this specification (including any accompanying potential points of novelty, abstract and drawings), or to any novel one, or any novel combination, of the steps of any method or process so disclosed.

What is claimed is:

1. A containment structure comprising an annular structure configured to provide close tolerance to a rotation structure, the containment structure comprising:

a first abradable structure;

a second abradable structure;

a shroud defined by the first abradable structure and the second abradable structure;

an annular surface of the shroud defined in part by the first abradable structure and in part by the second abradable structure;

a rub path defined on the surface of the shroud by alternating first regions and second regions, the first regions being defined by the first abradable structure and the second regions being defined by the second abradable structure; and wherein the first regions are spaced-apart along the annular surface such that at any given time, a first blade tip of a fan is positioned opposite a first one of the first regions, a second blade tip of the fan is positioned opposite a first one of the second regions, and a third blade tip of the fan has a first portion positioned opposite a second one of the first regions and a second portion positioned opposite a second one of the second regions, wherein a quantity of first regions is equal to one less than a number of blades on the fan that is associated with the containment structure.

2. The containment structure of claim 1, wherein the first abradable structure is non axi-symmetric.

3. The containment structure of claim 2, wherein the first abradable structure has portions that are spaced away from the annular surface.

4. The containment structure of claim 3, wherein a portion of the first abradable structure is separated from the inner annular surface by the second abradable structure.

5. The containment structure of claim 1, wherein the first regions and the second regions are arranged such that a constant number of blade tips are positioned opposite the first regions when the rotation structure is rotating.

6. A fan containment structure configured for use in an aircraft engine, the fan containment structure comprising:

a fan positioned within the fan containment structure;

a shroud configured for close tolerances with a fan;

an inner annular surface that is normally spaced apart from the fan and that is defined by the shroud;

a plurality of first abradable surfaces and a plurality of second abradable surfaces that together define the inner annular surface, wherein the plurality of first abradable surfaces are spaced-apart along the inner annular surface such that at any given time, a first blade tip of the fan is positioned opposite a first one of the plurality of first abradable surfaces, a second blade tip of the fan is positioned opposite a first one of the plurality of second abradable surfaces, and a third blade tip of the fan has a first portion positioned opposite a second one of the plurality of first abradable surfaces and a second portion positioned opposite a second one of the plurality of second abradable surfaces, a quantity of first abradable surfaces being equal to one less than a number of blades on the fan that is associated with the containment structure: and wherein the plurality of first abradable surfaces and the at least one second abradable surface have different hardnesses.

7. The fan containment structure of claim 6, comprising:

a rub path defined on the inner annular surface of the shroud by the plurality of first abradable surfaces and the plurality of second abradable surfaces.

8. The fan containment structure of claim 7, wherein the plurality of first abradable surfaces is harder than the plurality of second abradable surfaces.

9. The fan containment structure of claim 6, wherein the plurality of first abradable surfaces is defined by a first abradable structure that is non axi-symmetric.

10. The fan containment structure of claim 9, wherein a portion of the plurality of first abradable surfaces is separated from the inner annular surface by the plurality of second abradable surfaces.

11. The fan containment structure of claim 8, wherein the plurality of first abradable surfaces and the plurality of second abradable surfaces are arranged such that a constant number of blade tips is positioned opposite the plurality of first abradable surfaces when the fan is rotating.

12. A fan and an annular shroud combination configured such that the fan defines an outer-perimeter that is normally spaced-apart from the annular shroud, the combination comprising:

a plurality of blades that are attached to a hub;

a first abradable structure and a plurality of second abradable structures that together define at least a part of the annular shroud;

a plurality of first surfaces defined by the first abradable structure;

a plurality of second surfaces defined by the plurality of second abradable structures; and wherein the plurality of first surfaces and the plurality of second surfaces define an annular surface that is spaced apart from the blades during normal operation of the fan and annular shroud combination, and wherein the plurality of first surfaces are spaced-apart along the annular surface such that at any given time, a first blade tip of the plurality of blades is positioned opposite a first one of the plurality of first surfaces, a second blade tip of the plurality of blades is positioned opposite a first one of the plurality of second surfaces, and a third blade tip of the plurality of blades has a first portion positioned opposite a second one of the plurality of first surfaces and a second portion positioned opposite a second one of the plurality of second surfaces, a number of first surfaces being one less than a number of blades.

13. The fan and shroud combination of claim 12, wherein the plurality of first surfaces is non-axially symmetrically distributed around the first abradable structure.

14. The fan and shroud combination of claim 12, wherein each of the first surfaces is surrounded by a portion of the second surface.

* * * * *